United States Patent
King

(10) Patent No.: US 9,569,243 B2
(45) Date of Patent: Feb. 14, 2017

(54) OFFLOADING AND PARALLELIZING TRANSLATION TABLE OPERATIONS

(71) Applicant: International Business Machines Corporation, Armonk, NY (US)

(72) Inventor: Justin K. King, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/561,378

(22) Filed: Dec. 5, 2014

(65) Prior Publication Data

US 2016/0162311 A1 Jun. 9, 2016

(51) Int. Cl.
*G06F 9/455* (2006.01)
*G06F 13/28* (2006.01)

(52) U.S. Cl.
CPC .......... *G06F 9/45558* (2013.01); *G06F 13/28* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 7,409,487 B1 * | 8/2008 | Chen et al. | ......... G06F 12/1036 711/209 |
| 8,327,187 B1 * | 12/2012 | Metcalf | ................... G06F 12/10 714/10 |
| 8,629,878 B2 | 1/2014 | Jackson | |
| 2004/0181625 A1 * | 9/2004 | Armstrong et al. | ...... G06F 1/26 710/200 |
| 2005/0210158 A1 * | 9/2005 | Cowperthwaite et al. | ................... G06F 9/45558 710/1 |

(Continued)

FOREIGN PATENT DOCUMENTS

WO 2013091185 A1 6/2013

OTHER PUBLICATIONS

Sahil Suneja, "Accelerating the cloud with heterogeneous computing", 2011, USENIX Association Berkeley, CA, USA.*

(Continued)

*Primary Examiner* — Lewis A Bullock, Jr.
*Assistant Examiner* — Wynuel Aquino
(74) *Attorney, Agent, or Firm* — Patterson + Sheridan, LLP

(57) ABSTRACT

Embodiments disclosed herein generally include a computer-implemented method, computer program product, and system to facilitate offloaded and parallelized direct memory access (DMA) translation table operations. The method includes a hypervisor requesting a lease on an auxiliary parallel processing element assigned to a first virtual machine hosted by the hypervisor. The method further includes receiving a grant of the lease, whereby ownership of the auxiliary parallel processing element is transferred from the first virtual machine to the hypervisor. The method further includes, during the lease, providing a predefined program to execute on the auxiliary parallel processing element in order to perform a desired operation on the hypervisor DMA translation table and with parallelism. The method further includes, upon completion of the predefined program, terminating the lease by the hypervisor, whereby ownership of the auxiliary parallel processing element is returned to the first virtual machine.

19 Claims, 9 Drawing Sheets

(56) References Cited

U.S. PATENT DOCUMENTS

2013/0057560 A1    3/2013  Chakraborty et al.
2013/0326109 A1*  12/2013  Kivity .................. G06F 9/5016
                                                        711/6

OTHER PUBLICATIONS

U.S. Appl. No. 14/569,219 entitled "Offloading and Parallelizing Translation Table Operations", filed Dec. 12, 2014.
List of IBM Patents or Patent Applications Treated as Related.

* cited by examiner

OFFLOADING AND PARALLELIZING TRANSLATION TABLE OPERATIONS

BACKGROUND

The present disclosure relates to virtualized computing environments, and more specifically, to performing direct memory access (DMA) operations within virtualized computing environments.

Computer systems typically include a combination of computer programs and hardware, such as semiconductors, transistors, chips, circuit boards, storage devices, and processors. The computer programs are stored in the storage devices and are executed by the processors. A common feature of many computer systems is the transfer of data between hardware components. This transfer may be performed by a central processing unit (CPU) or it may be performed by a process known as direct memory access (DMA) in which a hardware unit accesses memory independently of the CPU.

SUMMARY

Embodiments disclosed herein generally include a computer-implemented method, computer program product, and system to facilitate offloaded and parallelized direct memory access translation table operations. The method comprises requesting, by a hypervisor hosting at least a first virtual machine, a lease on an auxiliary parallel processing element assigned to the first virtual machine, where the hypervisor is configured to manage a hypervisor DMA translation table, and where the first virtual machine is configured to manage a virtual machine DMA translation table. The method further comprises receiving, from the first virtual machine, a grant of the lease on the auxiliary parallel processing element assigned to the first virtual machine, whereby ownership of the auxiliary parallel processing element is transferred from the first virtual machine to the hypervisor. The method further comprises, during the lease and by operation of one or more computer processors when executing the hypervisor, providing a predefined program to execute on the auxiliary parallel processing element in order to perform a desired operation on the hypervisor DMA translation table and with parallelism. The method further comprises, upon the predefined program completing execution, terminating the lease by the hypervisor, whereby ownership of the auxiliary parallel processing element is returned to the first virtual machine.

Figure 1:
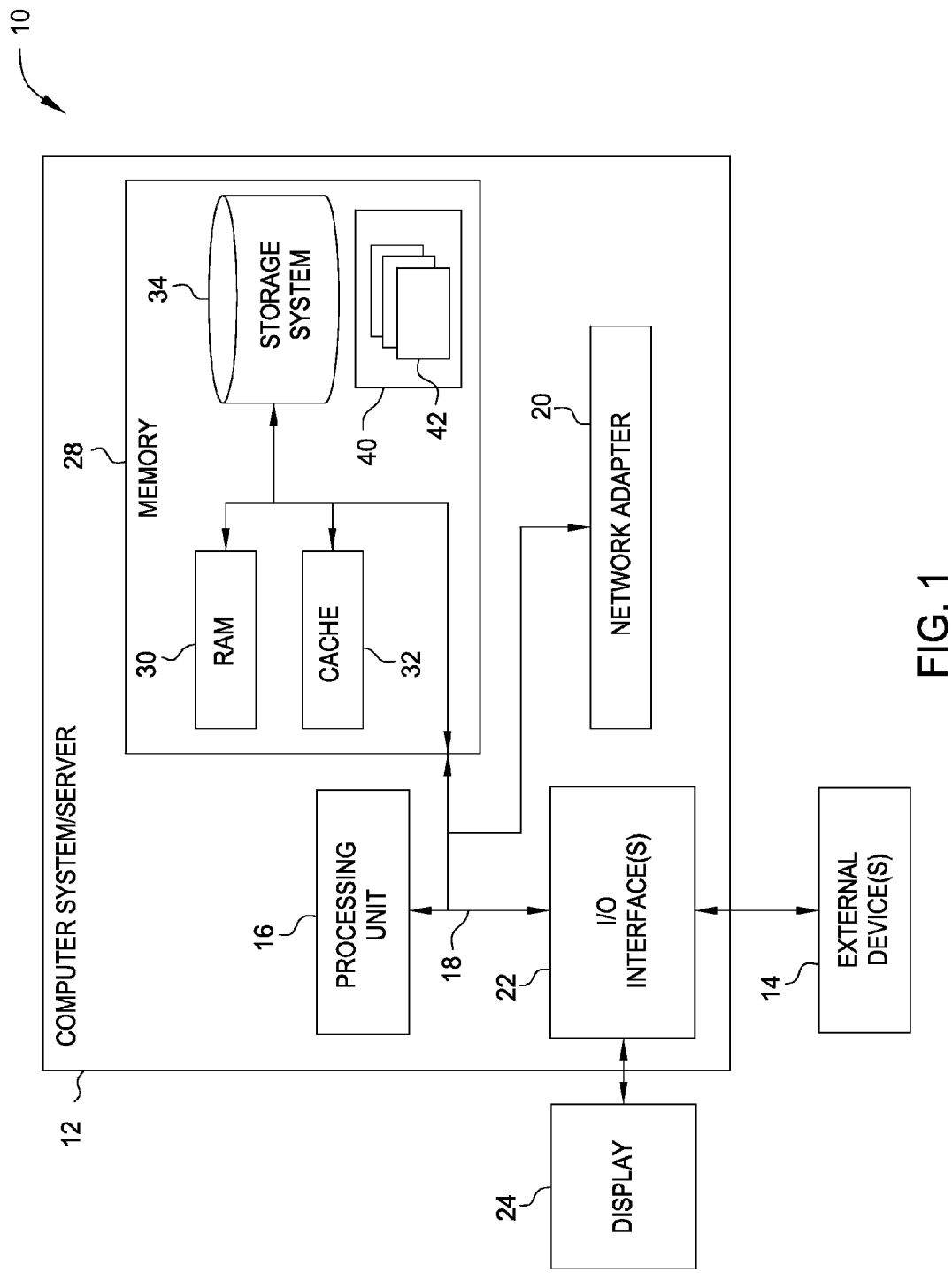
FIG. 1 illustrates a cloud computing node, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

By offloading operations, such as a scan of a DMA translation table, to a leased auxiliary parallel processing element, the operation may be performed in parallel with "normal" hypervisor operation. This generally improves the overall performance of the hypervisor and system. Additionally, the structure of the auxiliary parallel processing element may make it particularly well-suited for performing the offloaded operations, so that even beyond freeing the hypervisor's primary processing elements to perform their "normal" management functions, the auxiliary parallel processing element may be able to complete the operation faster than would the primary processing elements. In some embodiments, the auxiliary parallel processing elements may have a plurality of parallel threads (which in some cases may execute as SIMD instructions), which may be well-suited for performing systematic scanning, reading, and/or writing operations.

During DMA input/output (I/O) operations, a physical memory page may be pinned to prevent outside actors from modifying the contents of the page. Pinning may include setting a single bit in a corresponding page table entry for the page. However, this arrangement may be inadequate where individual physical memory pages can be mapped to multiple DMA addresses, as may be the case in hypervisor-managed virtualized computing environments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
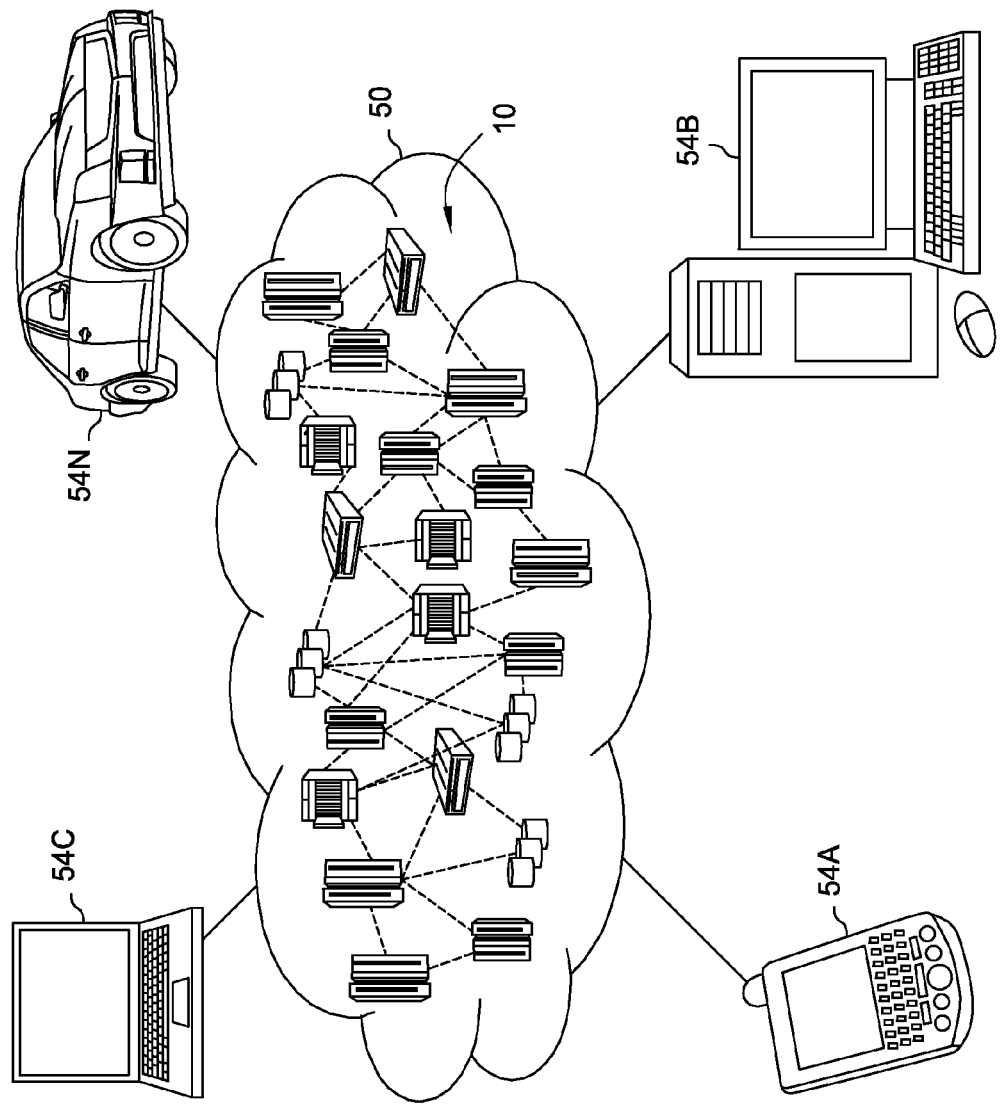
FIG. 2 illustrates a cloud computing environment, according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
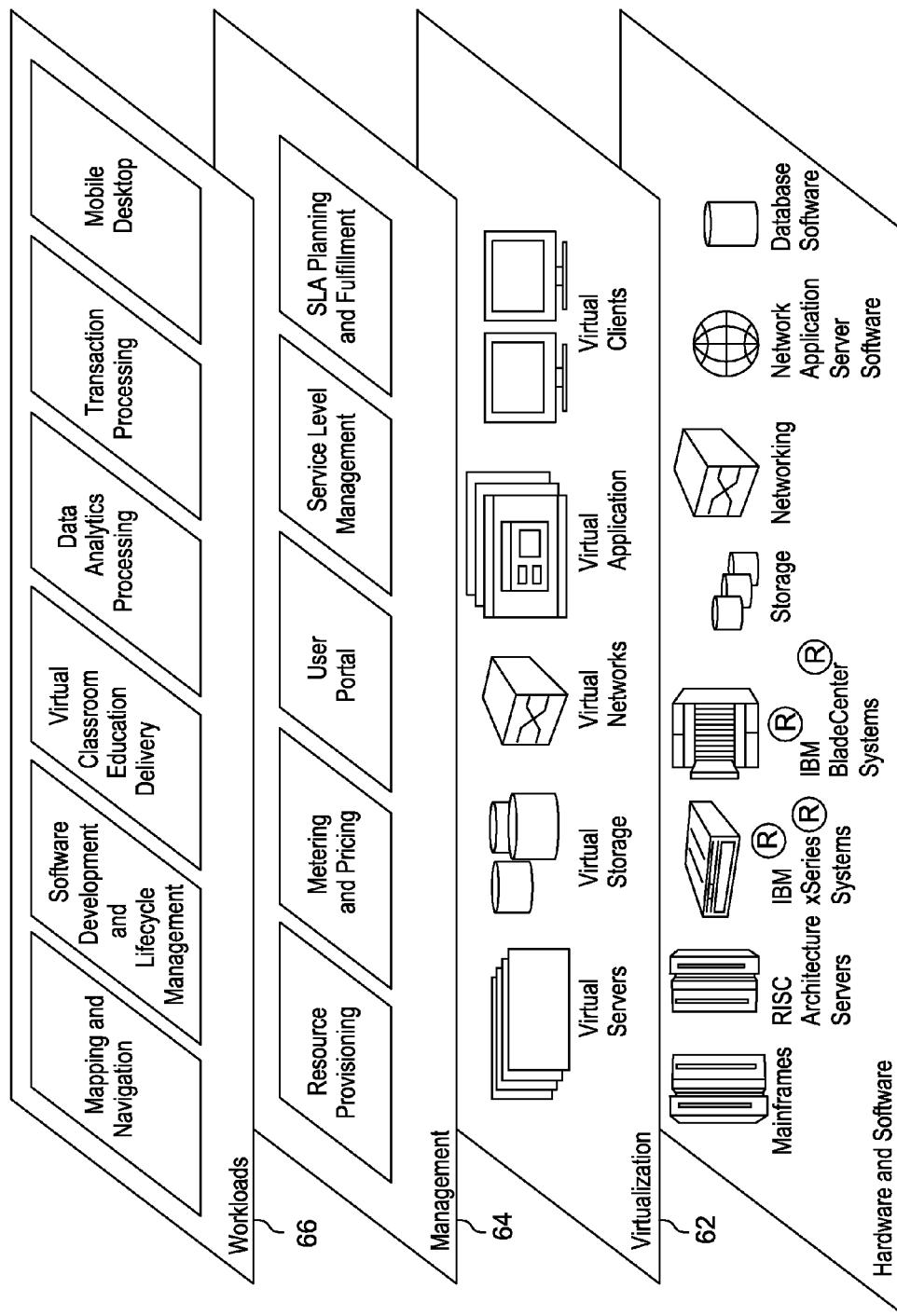
FIG. 3 illustrates abstraction model layers, according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
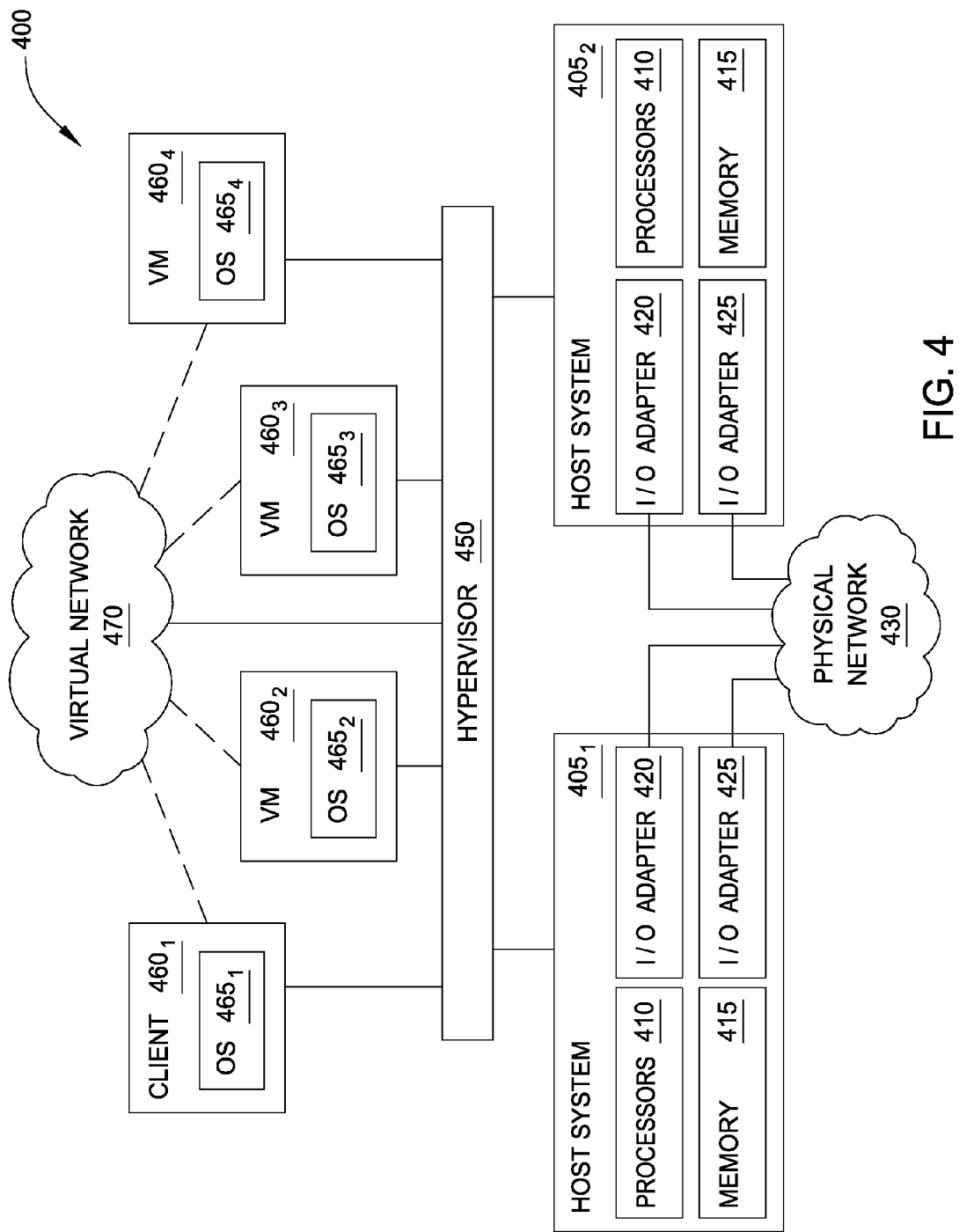
FIG. 4 illustrates an example virtualized computing environment, according to one embodiment.

FIG. 4 illustrates an example virtualized computing environment, according to one embodiment. Computing environment 400 may generally be used to implement techniques for performing various translation table-related operations described herein.

Computing environment 400 generally includes one or more host systems 405 coupled through a physical network 140, and one or more clients 160 which are coupled through a virtual network 170. Host systems 4051, 4052 may generally include any general purpose or special purpose computing system, and may generally operate at the hardware/software layer 60 described above. And like the description of computer system/server 12 above, examples of well-known computing systems that may be suitable for use as host systems 405 include, but are not limited to, personal computer systems, server computer systems, thin or thick clients, hand-held, mobile, or laptop devices, multiprocessor systems, microprocessor-based systems, set top boxes, programmable consumer electronics, network PCs, minicomputer systems, mainframe computer systems, and so forth. As shown, each host system 405 includes several components, such as one or more processors 410, memory 415, and one or more input/output (I/O) adapters 420, 425.

Processors 410 may generally include any processing element capable of performing various functions described herein. While depicted as a single element within a host system 405, processors 410 are intended to represent a single processor, multiple processors, a processor or processors having multiple cores, as well as combinations thereof. In one embodiment, processors 410 are central processing units (CPUs) of their respective host systems 405. The memory 415 may include a variety of computer readable media selected for relative performance or other capabilities: volatile and/or non-volatile media, removable and/or non-removable media, etc. Memory 415 may include cache, random access memory (RAM), storage, etc. Memory 415 may include one or more discrete memory modules, such as dynamic RAM (DRAM) dual inline memory modules (DIMMs). Of course, various memory chips, bandwidths, and form factors may alternately be selected. Storage may typically provide a non-volatile memory for the host system 405, and may include one or more different storage elements such as Flash memory, a hard disk drive, a solid state drive, an optical storage device, and/or a magnetic storage device.

The host systems 405 may communicate with other devices, such as peripheral devices or other networked computing devices, using one or more I/O interfaces. To communicate over physical network 430, the host systems 405 may each include one or more I/O adapters 420. In one embodiment, I/O adapters 420 may include network interface cards (NICs). Physical network 430 may include one or more networks of various types, including a local area or local access network (LAN), a general wide area network (WAN), and/or a public network (e.g., the Internet). Host systems 405 may also include other I/O adapters 425 that generally support a user's interface with the host system. For example, I/O adapters 425 may include connections for visual/audio/other sensory output devices, as well as connections for input devices such as a keyboard, mouse, touchscreen, etc. In one embodiment, I/O adapters 425 may include graphics cards that include separate processing elements and/or memory.

The host systems 405 may generally provide computing resources (such as processing and memory) to virtualization layer 62 that may be allocated among one or more client devices 460 (also generally referred to as virtual machines (VMs) or logical partitions). A hypervisor 450 may be included to actively manage the distribution and utilization of virtualized hardware resources. Hypervisor 450 may be included as part of one or more of the host systems 405 (e.g., as a software or firmware module operating on a host system), or the hypervisor may be included in a separate networked computing device, such as a server. As shown, several client devices $460_{1-4}$ are operating using the computing resources provided by the networked host systems 405. Of course, the number of client devices 460 and the corresponding hardware configurations may vary. Each of the client devices $460_{1-4}$ may execute a corresponding operating system $465_{1-4}$ as well as various applications or software.

The client devices 460 may be interconnected through a virtual network 470 that does not provide tangible physical connections between the virtual client devices. Hypervisor 450 may actively control the configuration of virtual network 470, routing traffic to and from client devices 460 through various virtual networking components (e.g., switches, routers, firewalls) to provide network segmentation, data isolation, etc.

Figure 5:
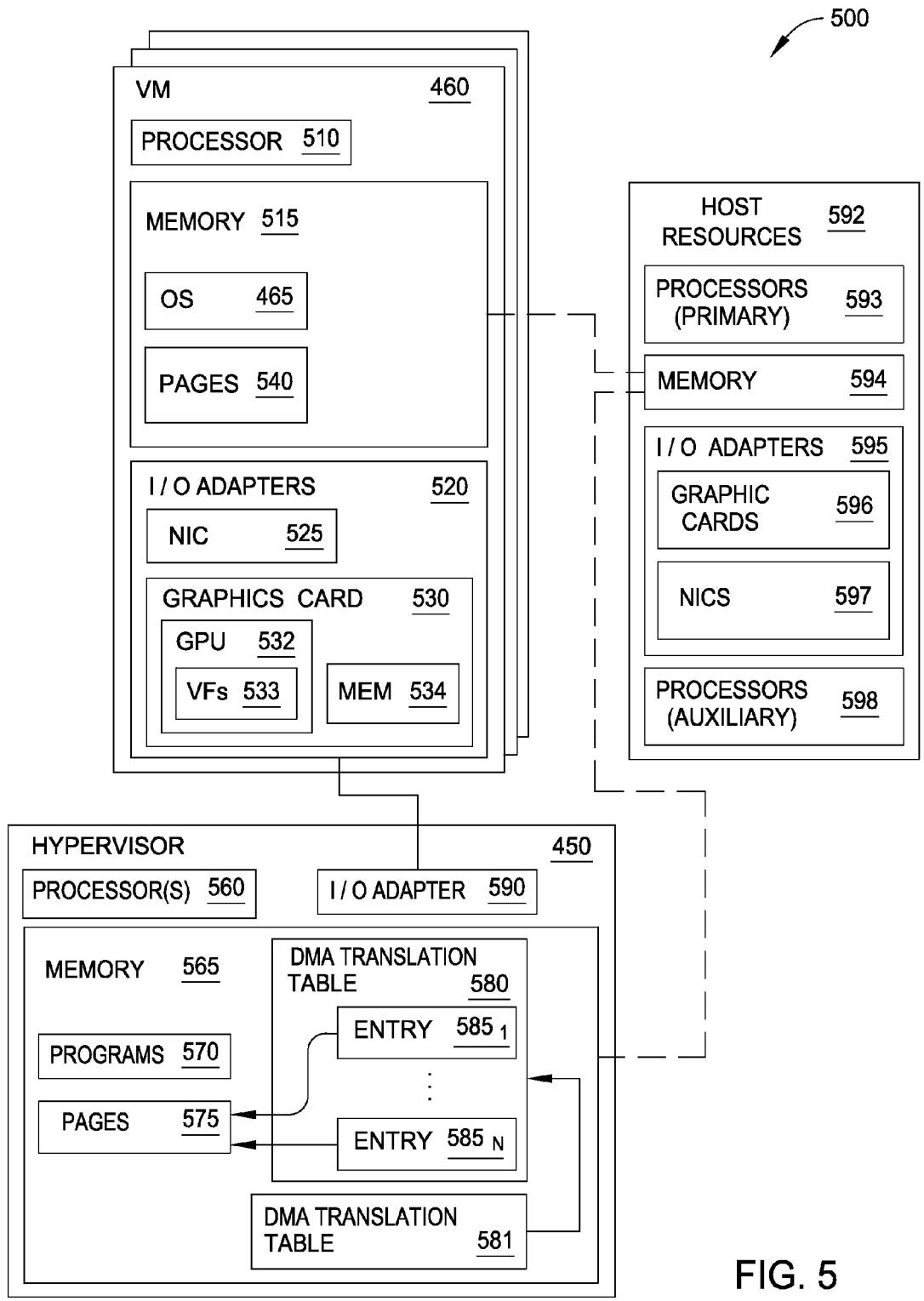
FIG. 5 illustrates an example arrangement of a hypervisor and virtual machines within a virtualized computing environment, according to one embodiment.

FIG. 5 illustrates an example arrangement of a hypervisor and virtual machines within a virtualized computing environment, according to one embodiment. The arrangement 500 may generally be used within computing environment 400 to implement techniques for performing the various translation table-related operations described herein.

Host resources 592 represents a consolidation of the various computing resources provided by the host systems 405, which are generally available for allocation and use by one or more virtual machines and/or hypervisors. Host resources 592 includes a plurality of primary processors 593 corresponding to the processors 410, memory 594 corresponding to the memories 415, and I/O adapters 595 corresponding to the I/O adapters 420, 425. I/O adapters 595 may include one or more graphics cards 596 and NICs 597. Host resources 592 also includes a plurality of auxiliary processors 598, which may include processors or processing units that are included with the host systems 405 but typically provide a specialized processing capability. For example, I/O adapters 595 may include expansion cards that include specialized processors or processing elements for providing the functionality of the expansion card (such as graphics, communications buses, digital signal processing, networking, and so forth). In one embodiment, I/O adapters 595 include one or more general-purpose graphics processing units (GPGPUs), which may generally be included in host systems 405 in graphics cards 596. While processors 410 may include a number of CPUs which are generally configured to provide general purpose multiprocessing or multithreading capabilities, auxiliary processors 598 such as GPGPUs may include a large number of relatively slow processing threads that are configured to execute in parallel. In one embodiment, some or all of the auxiliary processors' threads are configured to operate using single instruction, multiple data (SIMD) instructions, which are often found in multimedia processing applications.

In some embodiments, hypervisor 450 may operate using resources allocated from the consolidated host resources 592. In other embodiments, hypervisor 450 may be part of a separate, networked computing device. As shown, hypervisor 450 includes one or more processors 560, memory 565, and I/O adapter 590. Processors 560 may include general-purpose processors executing hypervisor software included in memory 565, or the processors 560 may include dedicated hardware (e.g., firmware) for performing hypervisor management functions. Memory 565 may include a number of physical memory pages 575 allocated to the hypervisor 450. Memory 565 also includes a DMA translation table 580 having a plurality of entries 5851-585N that collectively point to some or all of the pages 575. DMA translation table 580 may be included in hypervisor memory 565 and managed by the VM 460 (i.e., VM 460 dictates which of pages 575 the table entries point to). Because DMA translation table 580 is included in memory 565, the hypervisor 450 may check whether the VM requests that are related to DMA translation table 580 violate any security rules (e.g., maintaining VM memories separately), and hypervisor 450 may also translate the logical address space used by OS 465 into physical address space used by the DMA-related hardware.

Of course, these entries may be dynamically updated during operation of the hypervisor 450. Memory 565 may further include one or more additional DMA translation tables 581, which may point to physical memory pages 575 or to other DMA translation tables. Memory 565 also includes one or more programs 570 that may be provided to selected auxiliary processing elements to perform desired operations on a hypervisor DMA translation table.

Arrangement 500 also includes one or more VMs 460 that operate using resources allocated from the consolidated host resources 592. VM 460 includes one or more processors 510, a memory 515, and one or more I/O adapters 520. Memory 515 includes an OS 465. As shown, VM 460 also includes a plurality of I/O adapters 520, such as NIC 525 and graphics card 530. Graphics card 530 may include a separate processor(s) (i.e., GPU 532) and memory 534. The I/O adapters 520 may be connected to their respective host systems using any suitable bus or interface, such as a Peripheral Component Interconnect Express (PCIe) interface. Generally, graphics card 530 may support I/O virtualization, which allows the card to appear as one or more physical devices, and allows the card's resources to be provisioned (e.g., by an owning VM 460 or a hypervisor 450). For instance, a PCIe-based graphics card 530 may support Single Root I/O Virtualization (SR-IOV) having a plurality of physical functions (PFs) and virtual functions (VFs 533). As shown, the resources of the GPU 532 may be provisioned into one or more VFs 533. Though not shown, memory 534 and other resources of the graphics card 530 may be apportioned in a similar manner.

In some cases, the physical pages 540, 575 allocated to the VMs 460 and/or hypervisor 450 may point to a shared portion of memory 594. Conventionally, a memory page may be pinned during DMA I/O operations to prevent an outside actor (e.g., a hypervisor) from swapping out the memory page for another. In this case, pinning may include setting a single bit in a corresponding page table entry for the memory page. However, a single bit may be inadequate where the memory page can be mapped to multiple DMA addresses (e.g., shared between multiple VMs).

To permit a hypervisor to dynamically update memory allocations while maintaining data integrity for the operating VMs, a hypervisor could maintain a mapping reference count in memory that provides a complete record of each physical memory page with all corresponding mapped DMA addresses. However, in modern computing systems, maintaining such a reference count in the page table entries may require a prohibitively large amount of memory.

One alternative to maintaining a reference count is to request that the hypervisor scan the DMA translation table to locate all mappings to a particular memory page(s), for example, when "unpinning" the page(s). However, performing this scan using the hypervisor-allocated hardware may be prohibitively costly, as the DMA translation table may be large and because no interrupts may be handled by the hypervisor during completion of the scan.

In addition to pinning and unpinning memory pages, other hypervisor operations may require a DMA translation table to be systematically scanned, or may at least benefit from performing such a scan. For example, when a hypervisor reallocates ownership of an I/O port from a first VM to a second VM, the hypervisor clears the DMA translation table for the I/O port to remove all entries corresponding to the first VM. In some cases, this requires zeroing (i.e., writing a zero value to) all the entries. However, it is possible that not all entries of a particular DMA translation table are used, or are actively maintained. In the case of a sparsely populated DMA translation table (or portion of the table), using the hypervisor to clear the table (or portion) may be inefficient, as the hypervisor will spend a significant amount of time clearing translation entries that did not need to be cleared.

Scans of DMA translation tables may also be used to optimize hypervisor operations. For example, the scan of a DMA translation table may be performed to create a histogram or to compile other statistics on the mappings of table entries to physical memory locations. By using the histogram or statistics, those memory regions or blocks which have the greatest number of corresponding DMA mappings may be identified, and may generally have their performance improved by increasing the affinity of those memory regions to the processor performing the DMA operations. For example, for a VM allocated processors from a first host system and memory from at least a second host system, the hypervisor may adjust translation table entries to map to regions of memory that are closer to those processors (e.g., on the first host system). This might include a reallocation of memory that is already "owned" by the particular VM, or might include a reassignment of physical memory allocated to the VM by the hypervisor.

Figure 6A:
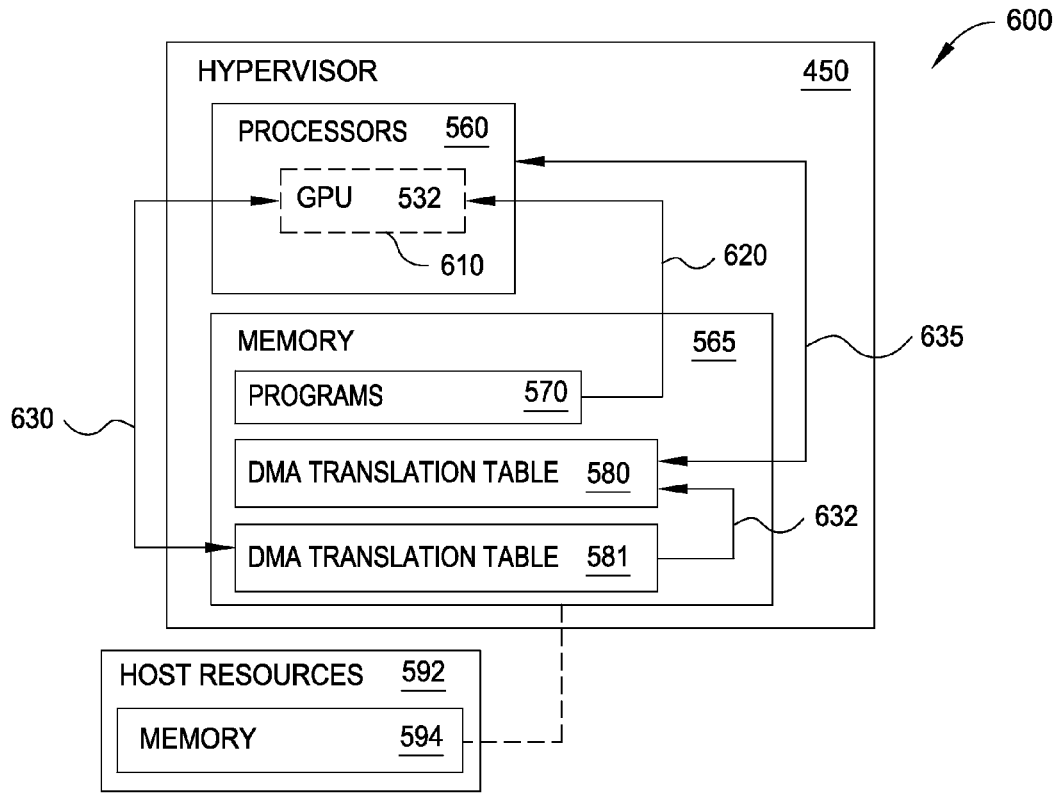
FIG. 6A illustrates a lease of an auxiliary processing element to a hypervisor for performing a parallel scan of a DMA translation table, according to one embodiment.

FIG. 6A illustrates a lease of an auxiliary processing element to a hypervisor for performing a parallel scan of a DMA translation table, according to one embodiment. In arrangement 600, hypervisor 450 includes processors 560 and memory 565. As discussed above, the computing resources used by the hypervisor may be from a separate computing device or may be allocated from the consolidation of host resources 592. For example, memory 565 may be allocated from consolidated memory 594. The processors 560 generally perform the hypervisor management functions. However, performing scans of DMA translation tables may be computationally expensive for the hypervisor 450 due to the unavailability of the processors 560 to perform other hypervisor tasks. Instead, the hypervisor 450 may use an auxiliary processing element to perform the translation table scan in parallel with "normal" operation of the hypervisor. Auxiliary processing elements may be included in various forms of I/O adapters, which are typically "owned" by individual VMs and not by the hypervisor. In one embodiment, a hypervisor 450 may request a lease from an operating VM for an auxiliary processing element, such as a general-purpose GPU 532. In some embodiments, the request may include the entire I/O adapter, such as the entire graphics card and not merely the GPU. After generating the request, the VM may determine whether or not the GPU may be leased to the hypervisor, which may include a determination of the current or expected usage of the GPU. For example, if the VM is utilizing (or expects to utilize) the GPU above a certain threshold amount during a time period of the lease, the VM may deny the hypervisor's lease request. Of course, other decisional logic may be applied to determine whether to grant the lease request.

The hypervisor 450 may include a number of programs 570 in memory 565 that are used to control the operation of a leased GPU 610. In one embodiment, when the lease of GPU is granted, the hypervisor 450 provides program code 620 to be executed using the leased GPU 610. Along with the program code, the hypervisor 450 may also provide a pointer to a DMA translation table 581. In one embodiment, the DMA translation table 581 may include pointers 632 to another DMA translation table 580, and the leased GPU 610 may perform the scan of the DMA translation table 580. In another embodiment, the leased GPU 610 may perform the scan of the DMA translation table 581.

Table 1 illustrates an example of program code that may be executed by a leased GPU to scan a DMA translation table. The program code may be provided to the leased GPU 610 by the hypervisor 450 after the grant of a lease by a VM. Of course, additions and/or modifications to the program code will be apparent to the person of ordinary skill in the art.

TABLE 1

```
___global___ void scanForDmaMappingRange( uint64* dmaTable, uint64
tableSize, uint64 globalThreadCount, uint64 rangeStart, uint64 rangeEnd,
uint64 & matchCount )
{
    int globalThreadId = blockDim.x*blockIdx.x + threadIdx.x;
    ___syncthreads( );
    int translationIndex = globalThreadId;
    while(translationIndex < tableSize)
    {
        uint64 translationEntry = dmaTable[translationIndex];
        if(translationEntry >= rangeStart && translationEntry <=
        rangeEnd)
            atomicAdd(matchCount, 1);
        translationIndex += globalThreadCount;
    }
}
```

Table 2 illustrates an example of program code used by a hypervisor to begin execution of the program code provided to the leased GPU, such as the example program code provided in Table 1. The program code may generally be executed by processors 560. Of course, additions and/or modifications to the program code will be apparent to the person of ordinary skill in the art.

TABLE 2

```
___host___ Boolean isATranslationInRange( uint64* hostDmaTable,
uint64 tableSize, uint64 rangeStart, uint64 rangeEnd )
{
    uint64* deviceDmaTable;
    uint64 matchCount = 0;
    cudaMalloc((void**) &deviceDmaTable, (tableSize * sizeof(void*)));
    cudaMemcpy(deviceDmaTable, hostDmaTable, (tableSize *
sizeof(void*)), cudaMemcpyHostToDevice);
    dim3 dimGrid(3, 1, 1);
    dim3 dimGrid(512, 1, 1);
    scanForDmaMappingRange<<<dimGrid,
dimBlock>>>(deviceDmaTable, tableSize, (dimGrid.x * dimBlock.x),
rangeStart, rangeEnd, matchCount);
    cudaDeviceSynchronize( );
    return (matchCount > 0);
}
```

Program code similar to that provided in Tables 1 and 2 may be suitable for performing various additional functions using DMA translation tables. Several examples mentioned above include scanning a DMA translation table to determine whether the translation table is clear (or zeroed), compiling statistics for the translation table, and creating a histogram.

Figure 6B:
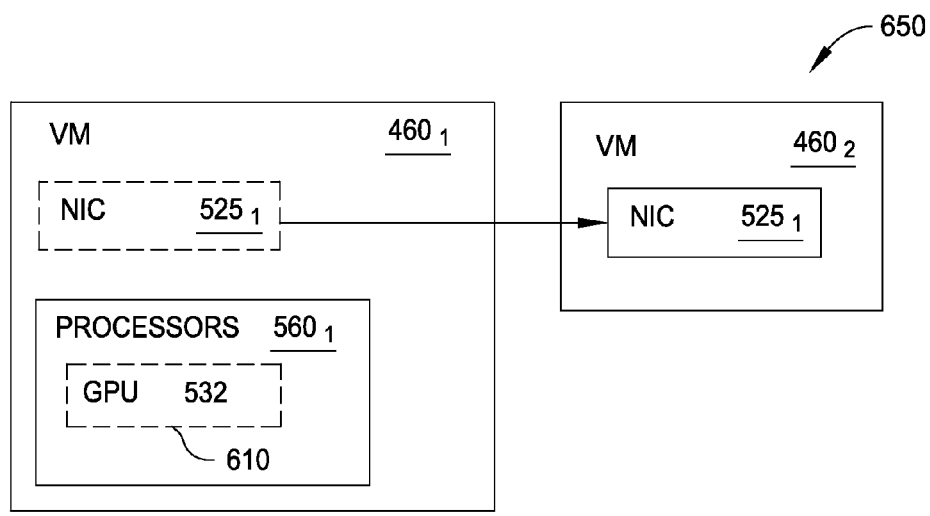
FIG. 6B illustrates reallocation of an I/O port between virtual machines using a parallel scan of a DMA translation table, according to one embodiment.

FIG. 6B illustrates reallocation of an I/O port between virtual machines using a parallel scan of a DMA translation table, according to one embodiment. FIG. 6B generally shows an example application of the leased GPU shown in FIG. 6A. Arrangement 650 shows the reallocation of NIC $525_1$ from a first VM $460_1$ to a second VM $460_2$. As part of the reallocation, a hypervisor may generally zero entries of a DMA translation table (not shown) corresponding to the NIC $525_1$ before transferring ownership to the other VM. To perform the systematic operation on the DMA translation table, the hypervisor may lease an auxiliary processor from one of the VMs, such as GPU 532 from VM $460_1$, and may offload the operation onto the leased GPU. As shown, the GPU 532 is initially owned by the same VM $460_1$ from which NIC $525_1$ is being reallocated, but the hypervisor may use an auxiliary processing element owned by any VM.

By offloading the scan of a DMA translation table to the leased GPU 610, the scan may be performed in parallel with hypervisor operation, which generally improves the overall performance of the hypervisor. Additionally, the structure or configuration of the GPU (or similar auxiliary processing elements) may be particularly well-suited for performing the DMA translation table scans. Even beyond freeing the primary processing elements (i.e., processors 560) to perform other hypervisor functions, the GPU having a plurality of parallel threads (which in some cases may execute as SIMD instructions) may be able to complete the table scan faster than would the processors 560.

Of course, the parallelism provided using the techniques described herein may be suitable for other operations beyond scanning operations including a DMA translation table. Other examples of suitable operations that may benefit from the offloaded, parallel processing using leased auxiliary processing elements include security operations, a memory scrubbing operation, an error correction operation, and a processor-sparing operation. Each of these operations may include a systematic scan, read, write, etc. for which the parallel processing structure of a GPU or other auxiliary processing element may be advantageous over CPUs.

In some embodiments, I/O adapters such as a graphics card including the GPU may support virtualization (e.g., SR-IOV for PCIe-based cards). In such embodiments the hypervisor may request, as alternative to requesting a lease on an entire graphics card, a lease on one or more portions of the virtualized I/O adapter. This may include one or more virtual functions of the graphics card.

In some embodiments, the parallel nature of GPUs may be used to overlap the timing of the DMA operations with the computations performed on the translation table and return time. For example, a single large, discrete DMA transfer of a translation table may be segmented into several smaller DMA transfers, each corresponding to a portion of the translation table and handled in a separate stream of the GPU. Each smaller DMA transfer may be immediately followed by a period of computation on that corresponding portion of the translation table. Using the parallel processing structure of the GPU, the timing of the computation on a first portion may at least partly overlap with a second DMA transfer, computation on the second portion may at least partly overlap with a third DMA transfer, and so on.

Figure 7A:
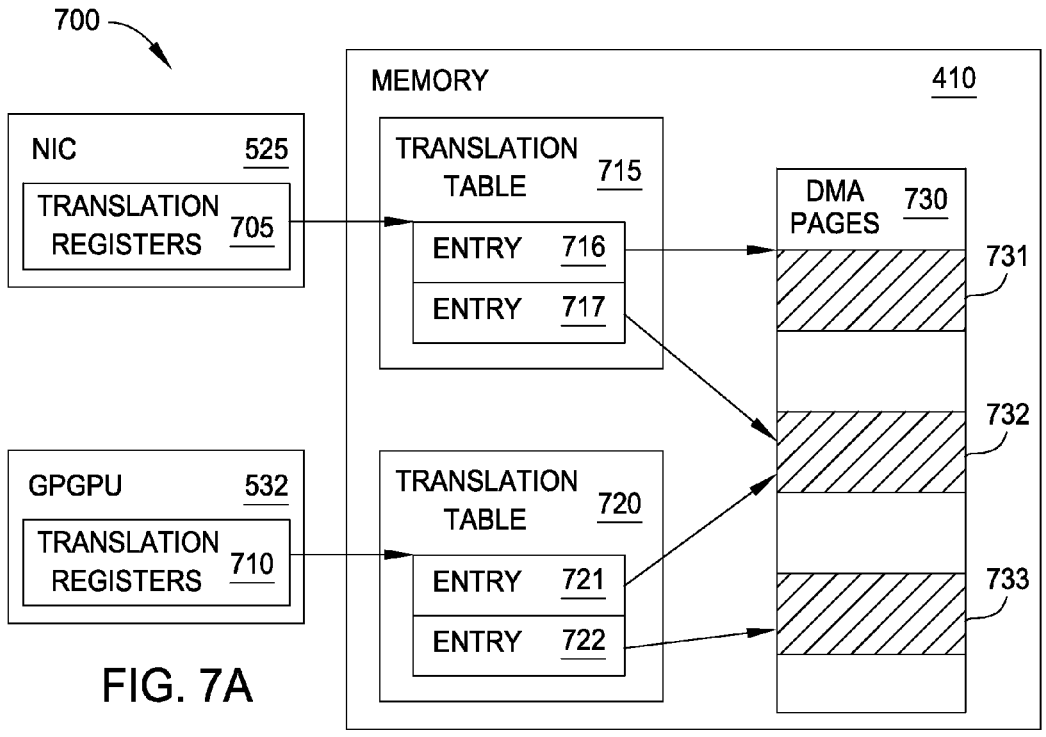
FIG. 7A illustrates a VM ownership mode of an auxiliary processing element, according to one embodiment.

FIG. 7A illustrates a VM ownership mode of an auxiliary processing element, according to one embodiment. In arrangement 700, a NIC 525 and a GPGPU 532 respectively include translation registers 705, 710 that point to translation tables 715, 720 in memory 410. Entries 716, 717, 721, 722 then point to various memory pages 731, 732, 733 in memory pages 730 of memory 410 for performing DMA operations. In arrangement 700, a VM owns both the NIC 525 and GPGPU 532.

Figure 7B:
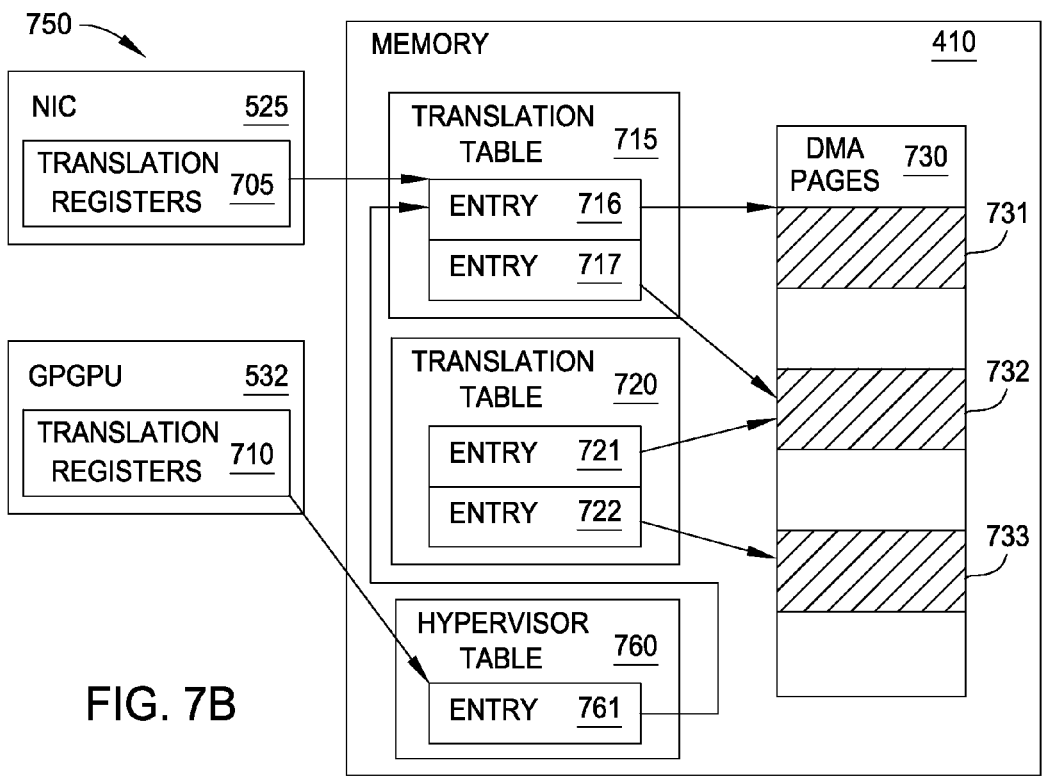
FIG. 7B illustrates a hypervisor ownership mode of an auxiliary processing element, according to one embodiment.

FIG. 7B illustrates a hypervisor ownership mode of an auxiliary processing element, according to one embodiment. Arrangement 750 illustrates the transfer of ownership of GPGPU 532 to the hypervisor following a grant of a lease by the VM. To transfer ownership, any operations currently executing on the GPGPU 532 are first halted. These operations may include DMA operations, memory-mapped I/O (MMIO) operations, and so forth.

In some embodiments (e.g., PCIe-based cards), the GPGPU 532 includes a hardware root complex component. In arrangements 700 and 750, the root complex component may include the translation registers 710. To transfer ownership of the GPGPU 532 from the VM to the hypervisor, the pointer included in the translation registers 710 to the VM's DMA translation table (i.e., translation table 720) is disabled, and a new pointer is provided for the root complex. In some embodiments, disabling the pointer may include reprogramming a (PCIe) host bridge, as well as issuing one or more operations to clear the DMA translation cache and to ensure memory consistency. In one embodiment, the operations may be a sync( )/dkill( )/sync( ) instruction sequence, which includes flushing all memory operations (i.e., sync( ) instruction), emptying the DMA translation cache and prevent reuse of the cache entries (i.e., dkill( ) instruction), and flushing all memory operations again before proceeding.

The new pointer points to a hypervisor-owned and managed DMA translation table (i.e., hypervisor table 760), which in turn points to one or more VM-managed DMA translation tables (i.e., translation table 715). After ownership of the GPGPU has been transferred to the hypervisor, the hypervisor may provide program code for execution on the GPGPU, as is discussed above with respect to FIG. 6A.

Upon completion of the DMA translation table scan or other desired operation(s), the hypervisor may terminate the lease on the GPGPU, returning ownership of the GPGPU to the VM. To transfer ownership back to the VM, the hypervisor halts all operations of the GPGPU and generally performs the reverse of the steps that are used to transfer ownership to the hypervisor. In one embodiment, this includes disabling the pointer to hypervisor table 760 and re-enabling the pointer to the VM-managed DMA translation table 720.

Figure 8:
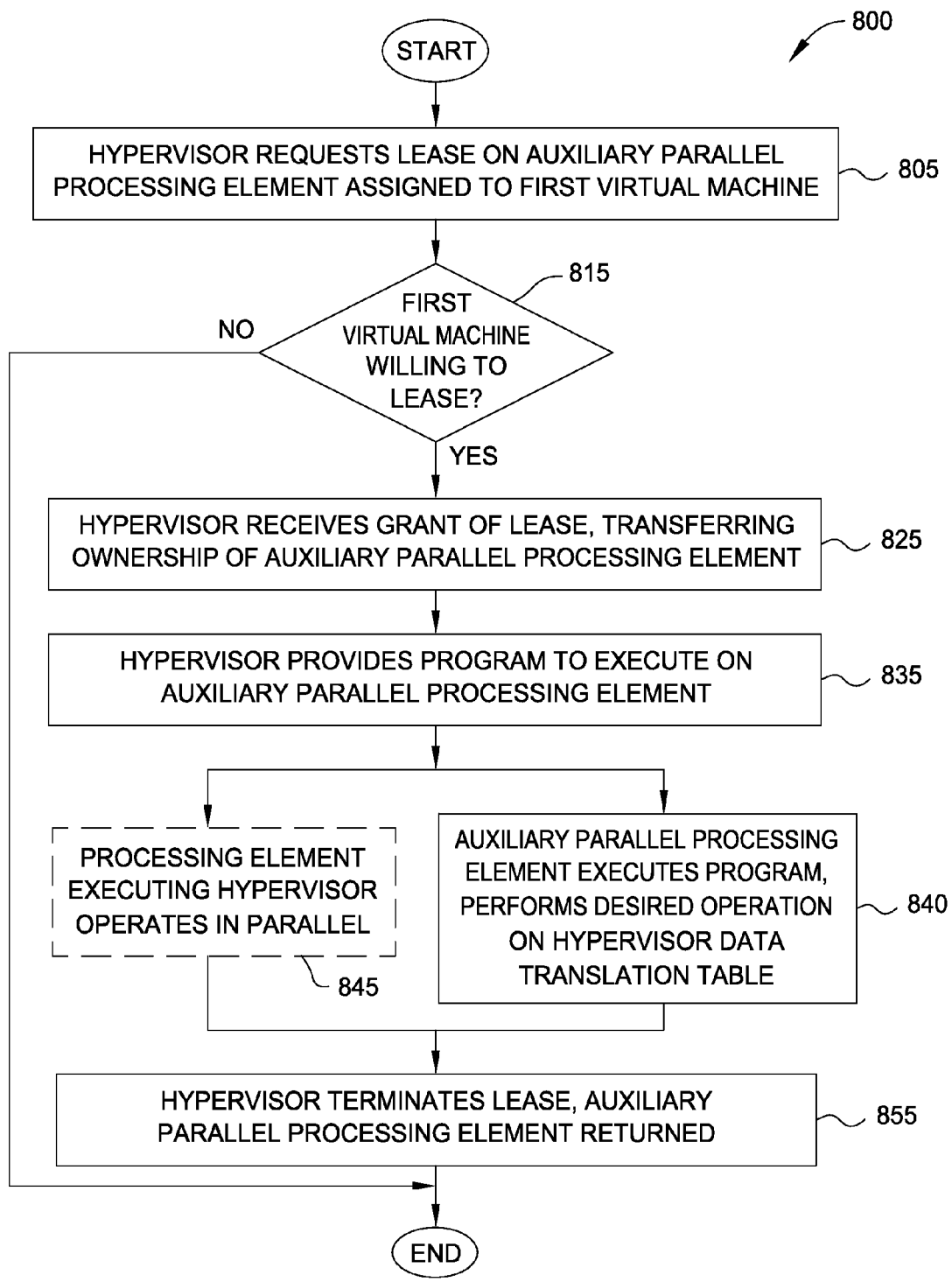
FIG. 8 illustrates a method to facilitate offloaded and parallelized direct memory access (DMA) translation table operations, according to one embodiment.

FIG. 8 illustrates a method to facilitate offloaded and parallelized direct memory access (DMA) translation table operations, according to one embodiment. Method 800 may generally be used in coordination with the various arrangements and features described above. Method 800 begins at block 805, where the hypervisor requests a lease of an auxiliary parallel processing element that is assigned to a first VM hosted by the hypervisor. In one embodiment, the auxiliary parallel processing element may be a general-purpose GPU that is included on a graphics card owned by the first VM.

At block 815, the first VM determines whether it is willing to lease the auxiliary parallel processing element to the hypervisor. Although not illustrated here, this block may include one or more decisional logic blocks that are collectively used to determine whether or not the first VM can and/or should lease the auxiliary parallel processing element to the hypervisor. In one embodiment, the decisional logic may be based on a current level and/or predicted level of usage of the auxiliary parallel processing element. For example, if the VM is utilizing the auxiliary parallel processing element above a certain threshold amount, or expects to utilize above a threshold amount during a time period corresponding to the lease, the first VM may deny the hypervisor's lease request. If the request is denied (i.e., "NO"), the method 800 ends. However, if the VM is willing to lease the auxiliary parallel processing element to the hypervisor (i.e., "YES"), the method proceeds to block 825. At block 825, the hypervisor receives a grant of the requested lease, and ownership of the auxiliary parallel processing element is transferred to the hypervisor. One or more steps may be required to transfer ownership of the auxiliary parallel processing element; one example ownership transfer is outlined in method 900 below.

At block 835, the hypervisor provides program code to be executed by the leased auxiliary parallel processing element. The program code may be a kernel or small program for performing a desired operation on a DMA translation table. As discussed above, embodiments may include unpinning table entries, zeroing table entries, or compiling statistics on the entries. In an alternative embodiment, the desired operation may be a predefined security operation, a predefined memory scrubbing operation, a predefined error correction operation, or a predefined processor sparing operation.

At block 840, the auxiliary parallel processing element executes the program, performing the desired operation on the DMA translation table. Block 845 may optionally occur, where primary processing elements allocated to the hypervisor operate in parallel to the DMA translation table operations.

At block 855, and upon completion of the desired operation on the DMA translation table, the hypervisor terminates the lease and returns the auxiliary parallel processing element to VM ownership. Example steps or functions that may be included with the transfer of ownership are discussed below.

Figure 9:
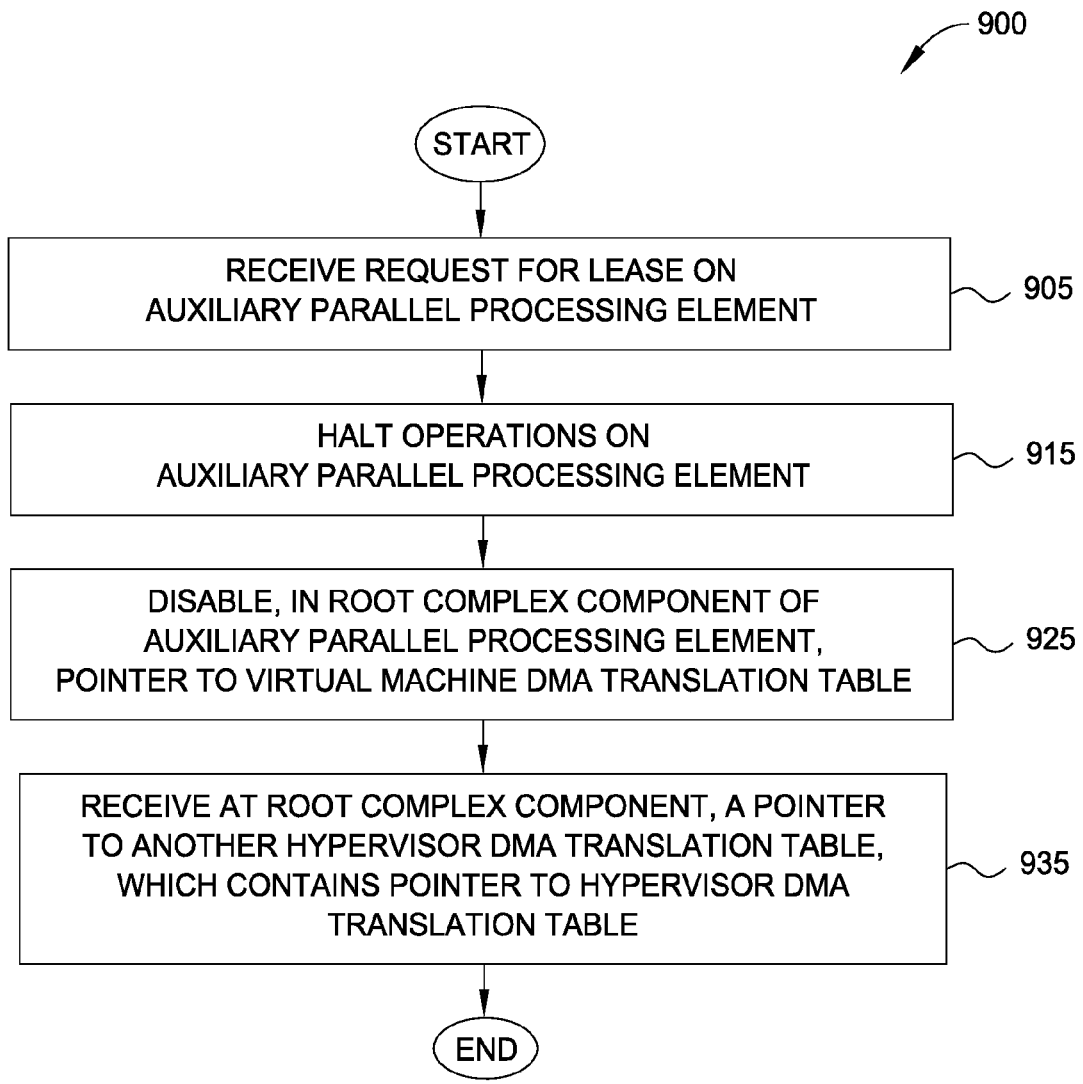
FIG. 9 illustrates a method of transferring ownership of an auxiliary processing element from a virtual machine, according to one embodiment.

FIG. 9 illustrates a method of transferring ownership of an auxiliary processing element from a virtual machine, according to one embodiment. Method 900 may generally be used in coordination with the various arrangements and features described above, and in one embodiment may be included as part of method 800. Method 900 begins at block 905, where the virtual machine receives a request for a lease on an auxiliary parallel processing element. Block 905 generally corresponds to blocks 805-825 of method 800. The hypervisor may host the virtual machine, and may send the request to the virtual machine. The virtual machine may own the auxiliary parallel processing element by virtue of owning a graphics card. In one embodiment, the auxiliary parallel processing element is a general-purpose GPU. In some embodiments, and where the graphics card supports virtualization (e.g., SR-IOV for PCIe cards) the request may be for a portion of the auxiliary parallel processing element, such as one or more virtual functions.

At block 915, and as part of granting the lease to the hypervisor, the virtual machine halts operations on the auxiliary parallel processing element. Although not illustrated here, this block may follow one or more decisional logic blocks that are collectively used to determine whether or not the virtual machine can and/or should lease the auxiliary parallel processing element to the hypervisor. In one embodiment, the decisional logic may be based on a current and/or predicted level of usage of the auxiliary parallel processing element.

At block 925, the hypervisor disables a pointer to the virtual machine's DMA translation table. In one embodiment, this may be performed in a root complex component of the graphics card.

At block 935, the VM may receive at the root complex component a pointer that points to a hypervisor-managed DMA translation table. In one embodiment, the hypervisor-managed DMA translation table includes a pointer to another, VM-managed DMA translation on which the desired operation will be performed. In an alternative embodiment, the desired operation will be performed on the hypervisor-managed DMA translation table. Operations may include a systematic scanning, reading, and/or writing function, such as unpinning entries, zeroing entries, or compiling statistics on the table entries. In these cases, using the auxiliary parallel processing element to perform the operation frees hypervisor processing elements. Additionally, the auxiliary parallel processing element may contain a number of relatively slow threads that operate in parallel, which may make the auxiliary parallel processing element more suitable for this type of operation.

Returning ownership of the auxiliary parallel processing element to the VM may occur upon completion of the operation, and generally includes the reverse of the steps that were used to transfer ownership to the hypervisor. In one embodiment, this includes halting operations of the auxiliary parallel processing element, disabling the pointer to the hypervisor-managed table, and re-enabling the pointer to the VM-managed DMA translation table.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product to facilitate offloaded and parallelized direct memory access (DMA) translation table operations, the computer program product comprising: a computer-readable storage medium having computer-readable program code embodied therewith, the computer-readable program code executable to: request, by a hypervisor executing on a primary parallel processing element and hosting at least a first virtual machine, a lease on an auxiliary parallel processing element assigned to the first virtual machine, wherein the hypervisor is configured to manage a hypervisor DMA translation table, wherein the first virtual machine is configured to manage a virtual machine DMA translation table referenced by the hypervisor DMA translation table; receive, from the first virtual machine, a grant of the lease on the auxiliary parallel processing element assigned to the first virtual machine, whereby ownership of the auxiliary parallel processing element is transferred from the first virtual machine to the hypervisor; during the lease, provide, by the hypervisor, a predefined program to execute on the auxiliary parallel processing element to perform a desired operation on the hypervisor DMA translation table, whereupon the predefined program is executed on the auxiliary parallel processing element in parallel with the hypervisor executing on the primary parallel processing element, and in order to identify memory pages referenced by the first virtual machine, wherein the desired operation on the hypervisor DMA translation table is selected from a plurality of operations comprising a predefined page table scanning operation; calculate, based on a result of the predefined page table scanning operation, statistical information in order to determine which identified memory pages have the most translations pointing thereto; facilitate memory affinity, based on the calculation, by placing said identified memory pages with increased proximity to the primary parallel processing element for performing subsequent virtual machine DMA operations; and upon the predefined program completing execution, terminate the lease by the hypervisor, whereby ownership of the auxiliary parallel processing element is returned to the first virtual machine.

2. The computer program product of claim 1, wherein the auxiliary parallel processing element includes hardware and comprises a general-purpose graphics processing unit (GPGPU).

3. The computer program product of claim 1, wherein the plurality of operations further comprises one of: a predefined security operation, a predefined memory scrubbing operation, a predefined, error correction operation, and a predefined processor sparing operation.

4. The computer program product of claim 1, wherein the desired operation is performed on the hypervisor DMA translation table by first accessing another hypervisor DMA translation table managed by the hypervisor to obtain a pointer to the hypervisor DMA translation table.

5. A system to facilitate offloaded and parallelized direct memory access (DMA) translation table operations, the system comprising: one or more computer processors; a memory containing a program which, when executed by the one or more computer processors, performs an operation comprising: requesting, by a hypervisor executing on a primary parallel processing element and hosting at least a first virtual machine, a lease on an auxiliary parallel processing element assigned to the first virtual machine, wherein the hypervisor is configured to manage a hypervisor DMA translation table, wherein the first virtual machine is configured to manage a virtual machine DMA translation table referenced by the hypervisor DMA translation table;

receiving, from the first virtual machine, a grant of the lease on the auxiliary parallel processing element assigned to the first virtual machine, whereby ownership of the auxiliary parallel processing element is transferred from the first virtual machine to the hypervisor; during the lease, providing, by the hypervisor, a predefined program to execute on the auxiliary parallel processing element to perform a desired operation on the hypervisor DMA translation table, whereupon the predefined program is executed on the auxiliary parallel processing element in parallel with the hypervisor executing on the primary parallel processing element, and in order to identify memory pages referenced by the first virtual machine, wherein the desired operation on the hypervisor DMA translation table is selected from a plurality of operations comprising a predefined page table scanning operation; calculating, based on a result of the predefined page table scanning operation, statistical information in order to determine which identified memory pages have the most translations pointing thereto; facilitating memory affinity, based on the calculation, by placing said identified memory pages with increased proximity to the primary parallel processing element for performing subsequent virtual machine DMA operations; and upon the predefined program completing execution, terminating the lease by the hypervisor, whereby ownership of the auxiliary parallel processing element is returned to the first virtual machine.

6. The system of claim 5, wherein the desired operation is performed on the hypervisor DMA translation table by first accessing another hypervisor DMA translation table managed by the hypervisor to obtain a pointer to the hypervisor DMA translation table.

7. The system of claim 5, wherein the auxiliary parallel processing element includes hardware and comprises a general-purpose graphics processing unit (GPGPU).

8. The system of claim 5, wherein the plurality of operations further comprises one of a predefined security operation, a predefined memory scrubbing operation, a predefined, error correction operation, and a predefined processor sparing operation.

9. The system of claim 5, wherein the virtual machine DMA translation table and the hypervisor DMA translation table both reside in hypervisor memory and not in virtual machine memory, wherein the desired operation is performed on the hypervisor DMA translation table by first accessing another hypervisor DMA translation table managed by the hypervisor to obtain a pointer to the hypervisor DMA translation table.

10. The system of claim 9, wherein the auxiliary parallel processing element includes hardware and comprises a general-purpose graphics processing unit (GPGPU), wherein the primary parallel processing element is included in the one or more computer processors.

11. The system of claim 10, wherein the desired operation is, in respective instances, a predefined page table scanning operation, a predefined security operation, a predefined memory scrubbing operation, a predefined, error correction operation, and a predefined processor sparing operation, wherein the predefined page table scanning operation is performed to identify existence of any mappings to memory pages, in order to prevent the hypervisor from swapping out memory pages pinned in memory to effect DMA operations, when a memory page is mappable to multiple DMA addresses, wherein pinning a memory page comprises setting a bit in a DMA translation table entry.

12. The system of claim 11, wherein the hypervisor DMA table is scanned without requiring the primary parallel processing element, executing the hypervisor, to scan the hypervisor DMA table, thereby offloading, at least in part and from the primary parallel processing element to the auxiliary parallel processing element, a processing cost associated with scanning the hypervisor DMA table, and without maintaining any DMA mapping reference count in the hypervisor DMA table.

13. The system of claim 12, wherein the auxiliary parallel processing element includes a root complex component having a pointer to the virtual machine DMA translation table, wherein granting the lease by the first virtual machine comprises: halting all operations on the auxiliary parallel processing element; disabling, in the root complex component, the pointer to the virtual machine DMA translation table; providing, to the root complex component, a pointer to the another hypervisor DMA translation table, which in turn contains the pointer to the hypervisor DMA translation table.

14. The system of claim 13, wherein the system includes a host bridge component, wherein the hypervisor-managed DMA translation table points to one or more virtual machine DMA translation tables including the virtual machine DMA translation table, wherein disabling the pointer includes reconfiguring the host bridge component and issuing a predefined instruction sequence to clear a DMA translation cache that is a subcomponent of the root complex component.

15. The system of claim 14, wherein the DMA translation cache caches entries, in respective instances, for the hypervisor DMA translation table and for the virtual machine DMA translation table, wherein the halted operations on the GPGPU include DMA operations and memory-mapped I/O (MMIO) operations, wherein the auxiliary parallel processing element is operable to support execution of at least single instruction, multiple data (SIMD) instructions.

16. The system of claim 15, wherein terminating the lease by the hypervisor comprises: halting all operations on the auxiliary parallel processing element; disabling, in the root complex component, the pointer to the hypervisor DMA translation table; and re-enabling, in the root complex component, the pointer to the virtual machine DMA translation table.

17. The system of claim 16, wherein the root complex component comprises a Peripheral Component Interconnect Express (PCIe) root complex component, wherein each virtual machine includes a set of virtualized resources, a guest operating system, and one or more executing applications, wherein in respective instances: (i) the auxiliary parallel processing element is operable to scan its own DMA translation table; (ii) the auxiliary parallel processing element supports single root I/O virtualization (SR-IOV), and the hypervisor controls a single SR-IOV virtual function (VF) rather than the entire GPGPU; and (iii) the auxiliary parallel processing element is operable to use streams of a predefined parallel computing framework, in order to overlap: (A) DMA operations of the virtual machine DMA translation table, with (B) computation on the auxiliary parallel processing element; wherein each stream includes a sequence of operations that execute in issue-order on the auxiliary parallel processing element.

18. The system of claim 17, wherein the system is operable in a virtual-machine mode of operation outside of the lease and in a hypervisor mode of operation during the lease, wherein: (i) in the virtual-machine mode of operation, in which the first virtual machine owns the auxiliary parallel processing element, the hypervisor scans the hypervisor DMA translation table by operation of the primary parallel processing element and responsive to a request from the first virtual machine; and (ii) in the hypervisor mode of operation, in which the hypervisor owns the auxiliary parallel processing element, the hypervisor scans the hypervisor DMA translation table by operation of only the auxiliary parallel processing element and responsive to a request from the first virtual machine.

19. The system of claim 18, wherein the hypervisor is owner of a network interface controller (NIC) that includes hardware, wherein the operation further comprises: clearing the hypervisor DMA translation table when an input/output (I/O) slot is moved between virtual machines hosted by the hypervisor, the virtual machines including the first virtual machine.

* * * * *